United States Patent
Keblys et al.

[15] 3,694,502
[45] Sept. 26, 1972

[54] HYDROCARBOXYLATION PROCESS
[72] Inventors: Kestutis A. Keblys, Southfield, Mich. 48075; Ronald L. Shubkin, Oak Park, Mich. 48237
[73] Assignee: Ethyl Corporation, New York, N.Y.
[22] Filed: Dec. 21, 1970
[21] Appl. No.: 100,355

[52] U.S. Cl. ............260/533 A, 260/413, 260/514 C
[51] Int. Cl. ................................................C07c 51/14
[58] Field of Search..........................260/533 A, 413

[56] References Cited
OTHER PUBLICATIONS
Imyanitov Zh. P. Kh. 40, 2825– 2828 (1967) Abstract only.

Primary Examiner—Lorraine A. Weinberger
Assistant Examiner—Richard D. Kelly
Attorney—Donald L. Johnson

[57] ABSTRACT

A process for preparing carboxylic acids from olefinic compounds having up to seven carbon atoms, CO and $H_2O$ using a cobalt catalyst in the presence of a ketone or ether, a pyridine promoter, and hydrocarbon is disclosed.

22 Claims, No Drawings

HYDROCARBOXYLATION PROCESS

BACKGROUND OF THE INVENTION

This invention is directed to the process for preparing carboxylic acids from low molecular weight olefinic compounds, CO and $H_2O$ using a cobalt catalyst; this process will also be referred to herein as a hydrocarboxylation process.

The reaction of olefins, CO and $H_2O$ using a cobalt catalyst is known. The use of solvents, which include ketones, to improve this reaction rate is also known (U.S. Pat. No. 2,911,422). Pyridine is also taught to be useful (a) as a solvent for this reaction [N. S. Imyanitov and D. M. Rudkovskii, Zh. P. Kh. 40, 2825–2828 (1967)]ketones as a product linearity promoter [N. S. Imyanitov and D. M. Rudkovskii, Zh. P. Kh. 41, 172–176 (1968)]. However, in the ether or ketone/pyridine system at low pyridine concentration, the rate of hydrocarboxylation of low molecular weight olefins is low. This reaction rate can be increased, as the aforesaid Russian article teaches, by increasing the concentration of pyridine.

It has been discovered that, quite unexpectedly, the reaction rate of the ether or ketone/low pyridine system is increased substantially, without increasing the pyridine promoter concentration, by carrying out the reaction in the presence of hydrocarbon.

SUMMARY OF THE INVENTION

A process for preparing carboxylic acids by reacting olefinic compound having from three to seven carbon atoms, CO and $H_2O$ using a cobalt containing catalyst in the presence of a reaction medium containing a ketone or ether diluent, pyridine promoter and hydrocarbon.

DESCRIPTION OF THE PREFERRED EMBODIMENTS

A preferred embodiment of the invention is a process for preparing carboxylic acids which comprises reacting olefinic compound having from three to seven carbon atoms, CO and water at temperatures above about 100°C. and pressure above about 750 p.s.i.g. using a cobalt containing catalyst in a reaction medium containing a. liquid organic diluent selected from $C_4$–$C_{16}$ alkyl ethers and $C_3$–$C_{13}$ alkyl ketones,
b. pyridine promoter in an amount such that the ratio of organic diluent volume:pyridine promoter volume is greater than about 9:1, and
c. hydrocarbon, in an amount such that the ratio of hydrocarbon volume-organic diluent volume is between about 10:1 and 1:10, said hydrocarbon being characterized by being liquid at the reaction temperature and pressure.

Olefinic compounds having seven carbon atoms or less are useful in the present invention. The term olefinic compounds means any organic compound having at least 1 non-aromatic, carbon-to-carbon double bond. It includes compounds having one or more of such carbon-to-carbon double bonds. Cyclic compounds as well as acyclic olefins, branched as well as linear olefinic compounds are included. Useful olefinic compounds may also contain other functional groups such as halide, carboxy, carbonyl, hydroxy, and the like, provided that these functional groups do not adversely effect the process of the present invention. Examples of useful olefinic compounds are pentanoic acids, 1,3-butadiene, 1,6-heptadiene, 2-methylpentene-1, 4-cyanobutene-1,3-bromohexene-1, 3-hydroxyheptene-1, and the like. Olefins are preferred olefinic compounds. By olefins is meant cyclic and acyclic hydrocarbons. Examples of such olefins are butene-2,2-methylbutene-1, heptene-3, isobutylene, cyclohexene, and the like. Alpha monoolefins are more preferred. Examples of these $\alpha$-olefins are propylene, butene-1, pentene-1, hexene-1, heptene-1,4-methylpentene-1, and the like. Mixtures of olefins are also useful in the present invention.

Water is also a reactant in the present process. The amount of water used can be varied. Ordinarily, at least one mole of water per double bond in the olefin component is provided. Using a monoolefin for illustration purposes, the molar ratio of olefin:water can range from 1:1 to 1:6 or higher. Olefin:water molar ratios ranging from 1:2 to about 1:6 are preferred. An olefin:water molar ratio of 1:3 is conveniently used.

The catalysts which are used in the present process are cobalt containing systems. The effective catalyst is thought to be a type of hydrido carbonyl complex; and thus any cobalt containing compound, cobalt metal and the like which will provide the effective complex under the reaction conditions can be used in the present process. Cobalt salts, e.g. cobalt hexanoate, cobalt chloride, cobalt chelates, or cobalt complexes can be used. Dicobalt octacarbonyl is quite conveniently used. Sufficient catalyst is generally used to provide about 0.001 to about 0.2 moles, of cobalt metal per mole of olefin reactant.

The process is ordinarily carried out under pressure. This pressure is primarily due to the carbon monoxide (CO) reactant. Thus, pressures ranging from about 750 to about 5,000 pounds per square inch gauge (p.s.i.g.) or higher can be used. Reaction pressures of 1,000 p.s.i.g. to about 3,500 p.s.i.g. are preferred.

The process of the present invention is generally carried out at elevated temperatures. Temperatures over about 100°C. are generally used. A preferred reaction temperature range is from about 125° to about 185°C. A most preferred reaction temperature is about 150°C.

The organic diluents which are used in the present hydrocarboxylation process are generally liquid organic compounds of the ketone or ether class. Typical diluents are the alkyl ketones having up to about 13 carbon atoms such as diisobutyl ketone, cyclohexanone, methylethyl ketone, methylisobutyl ketone, diamyl ketone, cyclohexylethyl ketone, di-n-hexyl ketone, and the like; and alkyl ethers having from 4 to about 16 carbon atoms such as diethyl ether, 1,4-dioxane, di-n-butyl ether, di-n-hexyl ether, diisopropyl ether, N-$C_1$-$C_4$-alkylmorpholines (e.g. N-methylmorpholine-2), N-butylmorpholine), di-2-ethylhexyl ether, $C_1$–$C_4$ dialkylglycol ethers and polyethers such as 1,2-diethoxy ethane, bis[2(2-methoxyethoxy)ethyl]ether, 1,2-diisopropoxy propane, 1,2-dimethoxy ethane and the like. Mixtures of these diluents can also be used. The ketone diluents are more preferred, and acetone is especially preferred.

The amount of organic diluent used in the present process can be varied. Ordinarily, the amount of diluent will not exceed the minimum amount by weight of the diluent (ether or ketone) which is required to form a solution of the olefinic compound and water at room temperature; it is preferred that between 20 and 60 percent and more preferably between about 30 percent to about 50 percent by weight of this minimum amount of diluent be used.

The product obtained in a hydrocarboxylation process is a mixture of acid isomers comprising linear acid as well as branched acids. This can be illustrated by the following reaction equation:

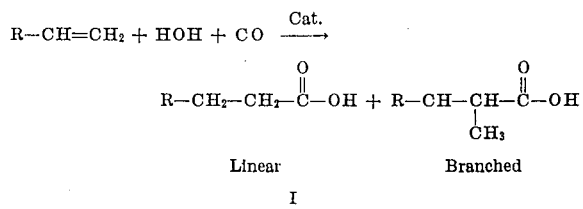

Linear         Branched

I

When using a linear α-olefin as one of the reactants under the conditions as heretofore described, the concentration of linear acid in the product ranges around 60 percent. The addition of small amounts of a pyridine to the process increases the percentage of linear acid obtained.

Pyridine promoters must be used in the hydrocarboxylation process. The pyridines which are used include pyridine itself as well as substituted pyridines. Useful substituted pyridines include $C_1$–$C_6$ alkyl pyridines (for example, beta picoline, 3-methyl-5-ethylpyridine, 4-hexylpyridine), the halopyridines (such as 3-bromopyridine, 3,5-diiodopyridine, 4-chloropyridine) acyl pyridines (such as 4-acetylpyridine, 3-butrylpyridine, 3-methyl-5-propionylpyridine), 3-nitropyridine, 4-cyanopyridine, and the like. Pyridine is a most preferred promoter.

The quantity of pyridine promoter used in less than about 10 percent of the total volume of organic diluent (ether or ketone) and pyridine combined. In other words the maximum amount of pyridine promoter used is about 1 volume per 9 volumes of ketone or ether diluent.

The concentration of pyridine is also related to the amount of cobalt present in the cobalt catalyst. Expressed in terms of molar ratio of pyridine:cobalt, useful promoter ratios are 1:1 to 10:1; 4:1 to 10:1 is a preferred range, and a 5:1 ratio is most preferred. The minimum volume of pyridine promoter used should be sufficient to meet the lowest useful pyridine: cobalt ratio.

A hydrocarbon is a required reaction medium component. The hydrocarbon is characterized by being liquid at the reaction temperature (about 100°C. and over) and pressure being utilized. Useful hydrocarbons include aliphatic as well as aromatic hydrocarbons. Examples of such hydrocarbons are toluene, xylene, diphenyl, cumene, paraffin wax, naphthalene, triacontane, eicosane, and the like. Preferred hydrocarbons are characterized by being normally liquid and having boiling points equal to or greater than the reaction temperature. Preferred hydrocarbons which are saturated are most preferred. These most preferred hydrocarbons generally have from seven to 16 carbon atoms.

Representative examples of such hydrocarbons are n-heptane, n-hexadecane, 2-ethylhexane, decahydronaphthalene, dimethylcyclohexane, and the like. Mixtures of hydrocarbons can also be used.

A sufficient amount of hydrocarbon is used in the process to effect the reaction rate improvement. The amount of hydrocarbon consequently can be varied and is conveniently based on the amount of organic diluent used. Thus, ratios of hydrocarbon volume:organic diluent volume ranging from about 10:1 to about 1:10 can be used; and ratios of from about 1:1 to about 1:10 are preferred.

The following examples will serve to illustrate the process of the present invention.

EXAMPLE 1

Without Hydrocarbon

An autoclave was charged with 50 milliliters (mls) of acetone, 4 mls of pyridine, 6.75 grams (gms) of water, and 1.5 gms of $Co_2(CO)_8$; and was flushed twice with carbon monoxide. The autoclave was then cooled below 0°C. and charged with 7.0 gms of butene-1. The autoclave was then sealed, pressured with carbon monoxide to 1,300 p.s.i.g. and heated to 150°C. The pressure at this temperature was 2,000 p.s.i.g. The mixture was maintained at this temperature with stirring for 3 hours and little pressure decrease was noted. At the end of the 3 hours the autoclave was cooled and vented. A light orange, clear liquid product was obtained. Vapor Phase Chromatographic (VPC) analysis showed the yield of pentanoic acids based on olefin charged was 6.9 percent of which 69 percent was linear $C_5$ acid.

When the experiment described above was repeated (except that 3.5 mls of pyridine were used), and the reaction was conducted for 16 hours, the yield of pentanoic acids based on olefin charged was only 21.7 percent, of which 65.4 percent was linear $C_5$ acid.

EXAMPLE 2

With Hydrocarbon

Using the procedure of Example 1, an autoclave was charged with the following ingredients: 50 mls of acetone, 6.78 gms of water, 3.5 mls of pyridine, 20 mls nonane, 1.5 gms of $Co_2(CO)_8$, and 7 gms butene-1 and carbon monoxide. The reaction was then carried out at 150°C. (the initial pressure at this temperature was 1,820 p.s.i.g.) for 3 hours. The up-take of carbon monoxide was noted to be rapid.

The orange liquid product obtained was analyzed by VPC. The yield of pentanoic acid based on olefin charged was 93.6 percent, of which 76.6 percent was linear $C_5$ acid.

When other organic diluents, either ketones or ethers, are used in place of the acetone in the process of Example 2, comparable rate improvement is also obtained. Analogous results are also obtained in Example 2 (a) when propylene, heptene-2, or 2-methylpentene-1 are used in place of butene-1; (b) when the reaction is carried out at 100°C., 125°C., 185°C., or higher; (c) using 5 mls, 500 mls, or 50 mls of nonane; (d) if substituted pyridines described herein or known to be useful as hydrocarboxylation promoters, are used in place of pyridine. Other hydrocarbons as described and characterized above are also effective when used in place of the nonane in Example 2.

The improvement in reaction rate effected by having hydrocarbon present in a cobalt catalyzed hydrocarboxylation to reaction carried out in a ketone (or ether) diluent in the presence of a pyridine promoter is clearly evidenced by comparing the butene-1 hydrocarboxylation reactions of Examples 1 and 2. In example 1, after 3 hours at 150°C., the yield of pentanoic acids is only 6.9 percent; and after 16 hours the yield is only 21 percent. When hydrocarbon is added to the reaction ingredients (Example 2), the yield of pentanoic acids after 3 hours, is increased in 93.6 percent. In addition to the reaction rate improvement, there also appears to be an improvement in product acid linearity (Example 1, 64 percent linear compared with Example 2, 76 percent linear).

In general, the rate of any cobalt catalyzed hydrocarboxylation of $C_3$–$C_7$ olefins in which a ketone or ether diluent and a pyridine promoter are used can be increased by having a hydrocarbon, of the type and in the concentration described herein, present as a reaction medium component. The process of the present invention is especially effective when $C_3$–$C_5$ olefins are the reactants.

The invention described above broadly encompasses the discovery that the rate of hydrocarboxylation of $C_3$–$C_7$ olefins using a cobalt catalyst, a ketone or ether diluent, and a pyridine promoter at temperatures above about 100°C. is substantially increased by having hydrocarbon present as a reaction medium ingredient. The present process is properly described and exemplified above. Claims to this invention follow.

We claim:

1. A process for preparing carboxylic acids which comprises reacting olefinic compounds having from three to seven carbon atoms, CO and water at temperatures of over 100°C. and at pressures above about 750 p.s.i.g. using a cobalt containing catalyst in a reaction medium containing
   a. liquid organic diluent selected from $C_4$–$C_{16}$ alkyl ethers and $C_3$–$C_{13}$ alkyl ketones,
   b. pyridine promoter in an amount such that the ratio of organic diluent volume: pyridine promoter volume is greater than about 9:1, and
   c. non-olefinic hydrocarbon, in an amount such that the ratio of hydrocarbon volume:organic diluent is between about 10:1 and 1:10, said hydrocarbon being characterized by being liquid at the reaction temperature and pressure.

2. The process of claim 1 wherein the molar ratio of pyridine promoter:cobalt is about 1:1 to about 10:1.

3. The process of claim 2 wherein the amount of said organic diluent is no greater than the minimum amount by weight of said diluent which is required to dissolve said olefinic compound and water at about room temperature.

4. The process of claim 3 wherein said diluent is said alkyl ethers.

5. The process of claim 3 wherein said diluent is said alkyl ketones.

6. The process of claim 5 wherein said ketone is acetone.

7. The process of claim 3 wherein said olefinic compound is olefin.

8. The process of claim 7 wherein said diluent is said alkyl ethers.

9. The process of claim 7 wherein said diluent is said alkyl ketones.

10. The process of claim 9 wherein said ketone is acetone.

11. The process of claim 10 wherein said olefin is butene-1.

12. The process of claim 1 wherein said hydrocarbon has up to about 20 carbon atoms.

13. The process of claim 12 wherein said hydrocarbon is saturated and aliphatic.

14. The process of claim 13 wherein said olefinic compound is olefin.

15. The process of claim 14 wherein said olefin has 3 to 5 carbon atoms.

16. The process of claim 15 wherein said diluent is said alkyl ethers.

17. The process of claim 16 wherein said diluent is dioxane.

18. The process of claim 15 wherein said diluent is said alkyl ketones.

19. The process of claim 18 wherein said diluent is acetone.

20. The process of claim 19 wherein said temperature is between about 125°C. and about 185°C. and said pressure is between about 750 p.s.i.g. and 5,000 p.s.i.g.

21. The process of claim 21 wherein said olefin is butene-1 and said hydrocarbon is nonane.

22. In a process for preparing carboxylic acids by the reaction of $C_7$ and lower olefins, CO and $H_2O$ using a cobalt containing catalyst and promoter quantity of a pyridine in $C_4$–$C_{16}$ alkyl ether or $C_3$–$C_{13}$ alkyl ketone diluent, at reaction temperatures over about 100°C. and pressures over about 750 p.s.i.g., the improvement which comprises carrying out the reaction in the presence of non-olefinic hydrocarbon in an amount such that the ratio of hydrocarbon volume:diluent is between about 10:1 and 1:10, said hydrocarbon being characterized by being liquid at the reaction temperature and pressure used.

* * * * *

PO-1050
(5/69)

UNITED STATES PATENT OFFICE
CERTIFICATE OF CORRECTION

Patent No. 3,694,502                Dated  September 26, 1972

Inventor(s)   Kestutis A. Keblys et al

It is certified that error appears in the above-identified patent
and that said Letters Patent are hereby corrected as shown below:

Column 1, line 16 - after "(1967)7" - insert phrase -- ; and
(b) in combination with ethers and --.

Column 1, line 55 - "volume-organic" should be -- volume:
organic --.

Column 3, line 6 - after "20" - insert symbol -- °/o --.

Signed and sealed this 6th day of February 1973.

(SEAL)
Attest:

EDWARD M. FLETCHER, JR.                ROBERT GOTTSCHALK
Attesting Officer                      Commissioner of Patents